United States Patent [19]

Dudley

[11] Patent Number: 4,795,304

[45] Date of Patent: Jan. 3, 1989

[54] PICKUP TRUCK LOADING RAMP

[76] Inventor: James D. Dudley, Rte. 1, Box 13, Bennington, Okla. 74723

[21] Appl. No.: 167,208

[22] Filed: Mar. 11, 1988

[51] Int. Cl.[4] .......................... B60P 1/00; B65G 67/02
[52] U.S. Cl. ...................................... 414/537; 14/71.1; 296/61
[58] Field of Search .................. 414/537, 538; 296/61; 14/695, 71.1; 224/42.03 R, 42.08

[56] References Cited

U.S. PATENT DOCUMENTS 3,642,156  7/1988  Stenson ............................... 414/537
3,713,553  7/1988  Curtis ................................... 414/537

Primary Examiner—Leslie J. Paperner
Assistant Examiner—G. Cundiff
Attorney, Agent, or Firm—Robert K. Rhea

[57] ABSTRACT

A folding ramp for attachment to the rear bumper and tailgate of a pickup truck. The ramp is formed by a pair of hingedly connected ramp panels of substantially equal overall dimension. One panel is slidably connected with the pickup truck tailgate in a manner to fold and unfold both panels from a loading to a stored position by vertical movement of the pickup tailgate. Legs support the ramp panels at their hinged position when loading and unloading wheeled vehicles, such as garden tractors, etc.

4 Claims, 1 Drawing Sheet

PICKUP TRUCK LOADING RAMP

BACKGROUND OF THE INVENTION

1. Field of the invention

This invention relates to loading ramps and more particularly to a pickup truck loading ramp.

Owners of pickup trucks who are frequently required to load and unload mobile vehicles or tools usually utilize a pair of plank or track-like members which must be manually positioned each time they are used for loading or unloading. This type of temporary ramp is generally satisfactory but has several disadvantages, for example, space occupied for storage in the pickup truck bed.

2. Description of the prior art

An example of pickup truck loading ramps is disclosed by U.S. Pat. No. 3,642,156. The ramp disclosed by this patent is attached to the rear end gate of a pickup truck and comprises a plurality of telescoping ramp sections telescopically expanded in loading position and which telescope into each other for a stored position adjacent one surface of the pickup truck bed end gate.

The loading ramp of this invention is distinctive over this and similar prior patents by providing a pair of open framework panels hinged for a folding together action. One of the panels being connected to the pickup truck rear bumper and slidably connected with the pickup truck end gate in a manner that folds and unfolds the ramp panels in unison with the closing and opening of the end gate.

SUMMARY OF THE INVENTION

A pair of generally rectangular open framework truck forming panels are formed by longitudinally extending parallel side members joined by transverse members. The pair of panels are hingedly connected in end to end relation for vertical pivoting movement about the horizontal axis of their hinged connection. A forward one of the panels has one end of its side members pivotally connected in spaced-apart relation to respective end portions of a rear end pickup truck bumper. The side members of the forward panel are slidably mounted in sleeves attached to the rearward normally upward portion of the tailgate so that vertical opening and closing movement of the tailgate raises and lowers the forward panel and simultaneously pivots the opposite or rearward panel toward and away from the vertical plane defined by the rearward limit of the pickup truck tailgate when in closed position. A pair of standards or posts, connected with the panels, at the respective lateral limit of their hinged connection, support the panels in a loading ramp position.

The principal object of this invention is to provide a pickup ramp for connection with the rearward portion of a pickup truck in a manner to fold and unfold from a loading ramp position to a stored position in unison with a closing or opening of the pickup truck bed end gate.

DESCRIPTION OF THE PREFERRED EMBODIMENTS

Figure 1:
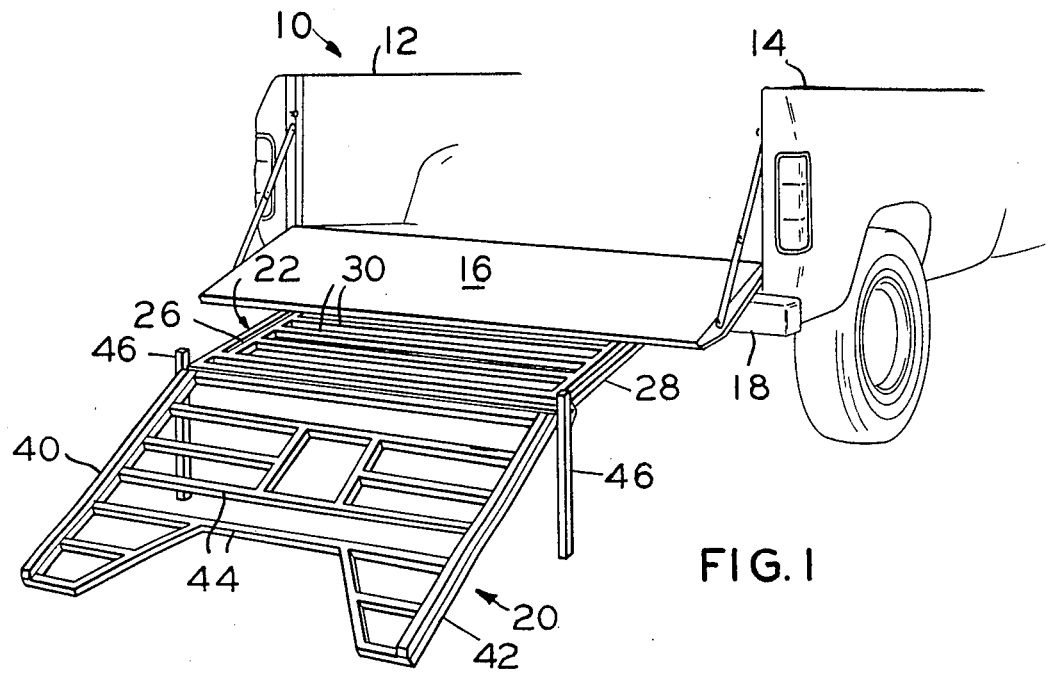
FIG. 1 is a fragmentary perspective view of a rearward end of a pickup truck illustrating the loading ramp in loading or unloading position.

Like characters of reference designate like parts in those figures of the drawings in which they occur.

In the drawings:

The reference numeral 10 indicates a pickup truck bed having side walls 12 and 14 defining lateral limits of the pickup bed. The pickup bed further includes a rear end or tailgate 16 hingedly connected with the depending limit of the side walls 12 and 14 for vertical pivoting movement about a horizontal axis. The pickup further includes a rearward bumper 18 mounted on the vehicle frame, not shown, and extending horizontally below the lowermost limit of the tailgate and pickup bed. The above description is conventional with most pickup trucks and is set forth to show the combination with which the loading ramp, indicated at 20, is normally used.

Figure 3:
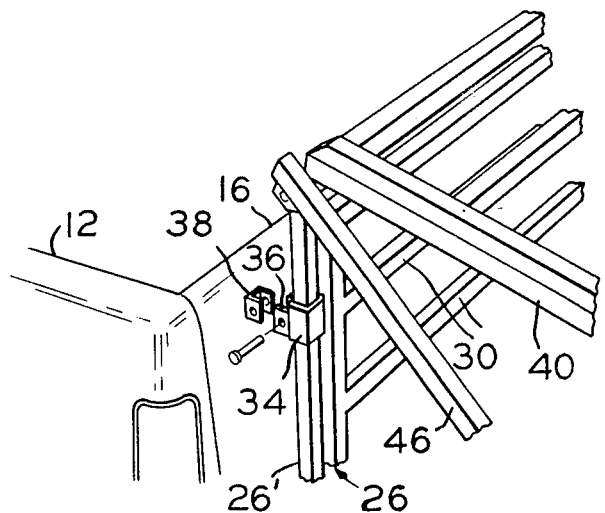

The loading ramp 20 comprises a pair of generally rectangular grid-like panels comprising a forward panel 22 and a rearward panel 24. The forward or front panel 22 is formed by front to rear longitudinally extending panels 26 and 28 each characterized, at their respective longitudinal side, by a pair of box-channel members for panel rigidity. The beams are transversely interconnected by a plurality of stringers or cross braces 30 preferably similarly formed from box-channel material. The forward limit of each of the forward panel beams 26 and 28 are pivotally connected, as at 32, with respective end portions of the bumper 18 for vertical pivoting movement of the panel 22 about a horizontal axis defined by the pivotal points 32. The laterally outward one of the box-channel members forming the beams 26 and 28 are slidably connected with the rearward surface of the tailgate 16 by a sleeve 34 surrounding the respective outermost box-channel, only the box-channel 26' being shown (FIG. 3). The sleeve 34 is provided with a lug 36 pinned to a bracket 38 cooperatively attached rigidly to the tailgate rearward surface adjacent its upper limit for the purposes presently explained.

The rearward ramp panel 24 similarly is formed by pairs of box-channel members disposed in superposed relation to form opposing spaced-apart parallel beams 40 and 42 of substantially equal length with respect to the length of the forward panel beams 26 and 28 and in respective longitudinal alignment therewith. Similarly, the beams 40 and 42 are interconnected by transverse stringers or cross braces 44 spaced-apart longitudinally of the rearward panel to provide traction for a wheeled vehicle moving therealong. The adjacent ends of the panels 26-40 and 28-42 are hingedly connected together for vertical pivoting movement about a horizontal axis and a folding of the ramp, as presently described.

Additionally, a pair of standards or posts 46 are pivotally connected with the panels adjacent their hinged connection for supporting the ramp panels when in vehicle loading or unloading position.

OPERATION

Figure 2:
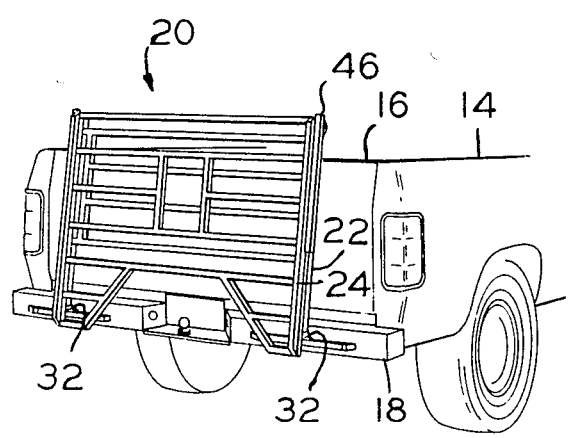
FIG. 2 is a perspective view, to a smaller scale, illustrating the ramp in folded travel position against the pickup truck end gate; and, FIG. 3 is a fragmentary perspective view, to a different scale, illustrating the manner in which the ramp is slidably connected with the pickup truck end gate to fold and unfold the ramp when opening and closing the end gate.

In operation, assuming the ramp is in its folded stored position adjacent the rearward limit of the closed pickup tailgate 16 (FIG. 2). The tailgate latch, not shown, is manually released and the tailgate lowered to the position of FIG. 1 with the rearward ramp panel 24 hingedly pivoted rearwardly so that the rearward limit of its beams 40 and 42 contact the surface of the earth rearwardly of the pickup. Simultaneously, with the lowering action of the tailgate, the forward panel supporting sleeve 34 slides along the beam box-channels 26' so that the plane of the forward ramp panel 22 describes a plane substantially parallel with the plane of the lowered tailgate. The ramp posts 46 are manually positioned vertically (FIG. 1). The ramp 20 is then in position for loading a wheeled vehicle, not shown, into or out of the pickup truck bed 10.

After utilizing the ramp for loading or unloading it is moved to a stored position by simply pivoting the forward panel vertically about its hinged connection with the bumper while simultaneously the tailgate is pivoting forwardly to its closed position wherein the sleeve 34 again slides along the beam box members 26 and the rearward ramp panel 24 pivot to a vertical juxtaposed position with the forward ramp panel 22.

Obviously the invention is susceptible to changes or alterations without defeating its practicability. Therefore, I do not wish to be confined to the preferred embodiment shown in the drawings and described herein.

I claim:

1. A loading ramp for a pickup truck having a horizontally hinged vertically pivotal end gate and having a rear bumper disposed below the horizontal axis of the end gate hinge, comprising:
    a pair of hingedly connected foldable panels comprising a forward panel and a rearward panel movably connected together by a first hinge means to permit vertical pivoting movement of said panels relative to each other about a horizontal axis,
    each of said panels having elongated beam means at its respective sides and having a plurality of cross braces interconnecting the side beam means,
    said panels extending, when in loading ramp position, rearwardly and downwardly to the surface of the earth from the rearward limit of the truck end gate when the latter is in opened position;
    second hinge means joining the ends of the forward said panel beam means to said bumper for vertical pivoting movement of said forward panel about a horizontal axis; and,
    sleeve means slidably joining the respective forward panel beam means to the rearward top edge portion of said end gate to permit vertical pivoting movement of said forward and rearward panels about said horizontal axes associated with said first and second hinge means toward and away from the surface of the earth when said end gate is opened and closed.

2. The loading ramp according to claim 1 and further including:
    support means adjacent the hinged juncture of said panels for supporting said ramp in a loading position above the surface of the earth.

3. The loading ramp according to claim 2 in which the support means includes:
    a leg connected with at least one of said panels at the respective side of said ramp.

4. The loading ramp according to claim 2 in which the sleeve means includes:
    a sleeve surrounding an intermediate portion of the respective forward panel beam means; and,
    bracket means securing the sleeve to said end gate surface.

* * * * *